(12) United States Patent
Arnell

(10) Patent No.: US 11,806,858 B2
(45) Date of Patent: Nov. 7, 2023

(54) IMPACT PROTECTING MEMBER FOR A CUTTING TOOL

(71) Applicant: Globe (Jiangsu) Co., Ltd., Changzhou (CN)

(72) Inventor: Thomas Arnell, Huskvarna (SE)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 180 days.

(21) Appl. No.: 16/651,268

(22) PCT Filed: Sep. 27, 2017

(86) PCT No.: PCT/CN2017/103742
§ 371 (c)(1),
(2) Date: Mar. 26, 2020

(87) PCT Pub. No.: WO2019/061095
PCT Pub. Date: Apr. 4, 2019

(65) Prior Publication Data
US 2020/0223051 A1 Jul. 16, 2020

(51) Int. Cl.
*B25F 5/02* (2006.01)
*A01G 3/053* (2006.01)
*A01G 3/08* (2006.01)

(52) U.S. Cl.
CPC ............... *B25F 5/02* (2013.01); *A01G 3/053* (2013.01); *A01G 3/086* (2013.01)

(58) Field of Classification Search
CPC .... A01G 3/047–067; A01G 3/085–088; A01D 34/412; A01D 34/416; B25F 5/02

USPC ...................... 30/276, 296.1; D8/8
See application file for complete search history.

(56) References Cited

U.S. PATENT DOCUMENTS

| 2,810,409 | A | * | 10/1957 | Ibelle et al. | ........ B27B 17/0016 30/296.1 |
| 2,881,519 | A | * | 4/1959 | Gardner | .............. B27B 17/0016 D8/8 |
| 3,711,946 | A | | 1/1973 | Troutman | |
| 3,977,078 | A | * | 8/1976 | Pittinger, Jr. | ........ A01D 34/416 30/276 |
| D250,450 | S | * | 12/1978 | Tiedemann | ...................... 30/276 |
| D250,630 | S | * | 12/1978 | Allegretti | ........................... D8/8 |

(Continued)

FOREIGN PATENT DOCUMENTS

| CN | 1596587 A | * | 3/2005 | ............. A01G 3/053 |
| CN | 1839675 A | * | 10/2006 | ............. A01G 3/033 |

(Continued)

OTHER PUBLICATIONS

Search Report and Written Opinion in related International Patent Application No. PCT/CN2017/103742 dated Jun. 22, 2018; 9 pages.

*Primary Examiner* — Jason Daniel Prone
(74) *Attorney, Agent, or Firm* — Rooney IP, LLC

(57) ABSTRACT

A cutting tool including a housing, the cutting tool having a longitudinal extension from the housing to a cutting element provided at the distal end of the cutting tool. The housing is provided with a rigid impact protecting member having at least a rigid portion, the rigid portion being transverse to the longitudinal extension of the cutting tool and provided at a distance from the housing such that the housing is protected from an impact.

10 Claims, 3 Drawing Sheets

(56) References Cited

U.S. PATENT DOCUMENTS

| | | | |
|---|---|---|---|
| 4,733,470 A * | 3/1988 | Firman | A01G 3/053 30/296.1 |
| 4,850,111 A * | 7/1989 | McCullough | B26B 25/002 30/276 |
| D327,483 S * | 6/1992 | Kwong | D8/8 |
| D338,676 S * | 8/1993 | Tuggle | D8/8 |
| 5,313,770 A * | 5/1994 | Smothers | A01D 34/416 30/276 |
| 5,361,851 A * | 11/1994 | Fox | B25F 5/021 30/296.1 |
| D367,595 S * | 3/1996 | Dahlberg | D8/8 |
| 5,544,417 A * | 8/1996 | Atos | A01D 34/4165 30/276 |
| D376,517 S * | 12/1996 | Masucci | D8/8 |
| 5,598,892 A * | 2/1997 | Fox | B25F 5/026 30/296.1 |
| D414,088 S * | 9/1999 | Juratovac | D8/8 |
| 5,957,214 A * | 9/1999 | Martinez | A01G 3/062 172/15 |
| 6,006,434 A * | 12/1999 | Templeton | A01D 34/90 30/276 |
| 6,178,642 B1 * | 1/2001 | Schaer | A01G 3/053 30/276 |
| 6,446,421 B1 * | 9/2002 | Kramer | A01G 3/053 30/381 |
| 6,918,185 B2 * | 7/2005 | Barger | B25F 5/021 30/296.1 |
| D547,622 S * | 7/2007 | Palermo | D8/8 |
| 7,275,322 B2 * | 10/2007 | Stones | A01G 3/053 30/296.1 |
| 7,299,553 B1 * | 11/2007 | Brann | B27B 5/08 30/276 |
| D581,753 S * | 12/2008 | Harris | D8/8 |
| D618,253 S * | 6/2010 | Wilson | D15/10 |
| D653,090 S * | 1/2012 | Stratford | D8/8 |
| 8,136,257 B2 * | 3/2012 | Lau | B25F 5/02 30/296.1 |
| 8,162,074 B2 * | 4/2012 | Cook | B25F 5/021 30/296.1 |
| 8,336,213 B2 * | 12/2012 | Stones | A01G 3/053 30/296.1 |
| 8,347,510 B2 | 1/2013 | Stones | |
| D720,582 S * | 1/2015 | Tinius | D8/8 |
| D740,088 S * | 10/2015 | Ishikawa | D8/8 |
| 9,855,650 B2 * | 1/2018 | Fong | A01G 3/053 |
| D873,633 S * | 1/2020 | Arnell | D8/8 |
| 2003/0037933 A1 * | 2/2003 | Breneman | A01G 3/062 30/276 |
| 2004/0128839 A1 * | 7/2004 | Shaffer | A01D 34/416 30/276 |
| 2007/0068008 A1 * | 3/2007 | Wu | A01D 34/416 30/276 |
| 2007/0234579 A1 * | 10/2007 | Patrick | A01G 3/053 30/517 |
| 2008/0236986 A1 * | 10/2008 | Jesse | A01G 3/053 30/216 |
| 2013/0174424 A1 * | 7/2013 | Whited | B26B 25/002 30/276 |
| 2015/0366133 A1 * | 12/2015 | Nojiri | A01D 34/902 30/276 |
| 2016/0143218 A1 * | 5/2016 | Sergyeyenko | A01D 34/4163 30/276 |
| 2016/0227710 A1 * | 8/2016 | Pan | A01G 3/053 |
| 2017/0064909 A1 | 3/2017 | Sergyeyenko | |
| 2017/0203463 A1 | 7/2017 | Towner et al. | |
| 2017/0239829 A1 | 8/2017 | Pellenc | |
| 2020/0254601 A1 * | 8/2020 | Arnell | B25F 5/02 |
| 2021/0029898 A1 * | 2/2021 | Rosenthal | A01D 34/416 |
| 2021/0100170 A1 * | 4/2021 | Suzuki | A01G 3/053 |

FOREIGN PATENT DOCUMENTS

| | | | | |
|---|---|---|---|---|
| CN | 105411485 A * | 3/2016 | | A47L 5/28 |
| EP | 2196284 A2 * | 6/2010 | | B25F 5/02 |
| EP | 3756834 A1 * | 12/2020 | | B25F 5/02 |
| WO | WO-2019061095 A1 * | 4/2019 | | B25F 5/02 |
| WO | WO-2020173487 A1 * | 9/2020 | | A01G 3/08 |

* cited by examiner

IMPACT PROTECTING MEMBER FOR A CUTTING TOOL

FIELD OF THE INVENTION

The present disclosure relates to cutting tools with impact protecting members. Specifically it relates to cutting tools having a longitudinal extension and an impact protecting member comprising a substantially straight and rigid portion.

BACKGROUND OF THE INVENTION

Motorised gardening devices such as hedge trimmers are well known to gardeners. They generally comprise a cutting member at a distal end of the device and a housing comprising a motor and/or controlling aspects at a proximal end of the device. As the costs of electronic components has decreased over time a greater degree of electronics has been included in to the housing. The housing is, however, prone to damage from inadvertent knocks or impacts during use or storage. The greater the degree of components in the housing necessitates improved impact protection.

Furthermore, traditionally due to their long length the devices are difficult to store. They may be unstable if stored vertically resting on a portion of the housing.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing a cutting tool comprising a housing, the cutting tool having a longitudinal extension from the housing to a cutting element provided at the distal end of the cutting tool. The housing is provided with a rigid impact protecting member having at least a rigid portion, the rigid portion being transverse to the longitudinal extension of the cutting tool and provided at a distance from the housing such that the housing is protected from an impact.

In an aspect the impact protecting member is fixed to the housing via first and second arms, each of the arms having a longitudinal extension. The longitudinal axis of the arms is provided at an acute angle to the longitudinal extension member.

In one aspect the rigid portion is substantially straight.

In another aspect, the rigid portion and the arms of the impact protecting member form a substantially rectangular impact protecting member.

In a further aspect the impact protecting member is arranged at an upper portion of the housing.

In one aspect the impact protecting member may act as a stable platform for the cutting tool when the cutting tool is arranged with it longitudinal extension member is substantially vertical alignment.

In another aspect the rigid and substantially straight portion of the impact protecting member has a cross section which is substantially rectangular at an upper portion, and curved at a lower portion.

In some aspects the housing is adapted to receive an energy storage means. The impact protecting member thus acts as a shield limiting impacts to the battery pack.

BRIEF DESCRIPTION OF THE DRAWINGS

These and other aspects, features and advantages of which the invention is capable will be apparent and elucidated from the following description of embodiments of the present invention, reference being made to the accompanying drawings, in which.

DETAILED DESCRIPTION

Figure 1:
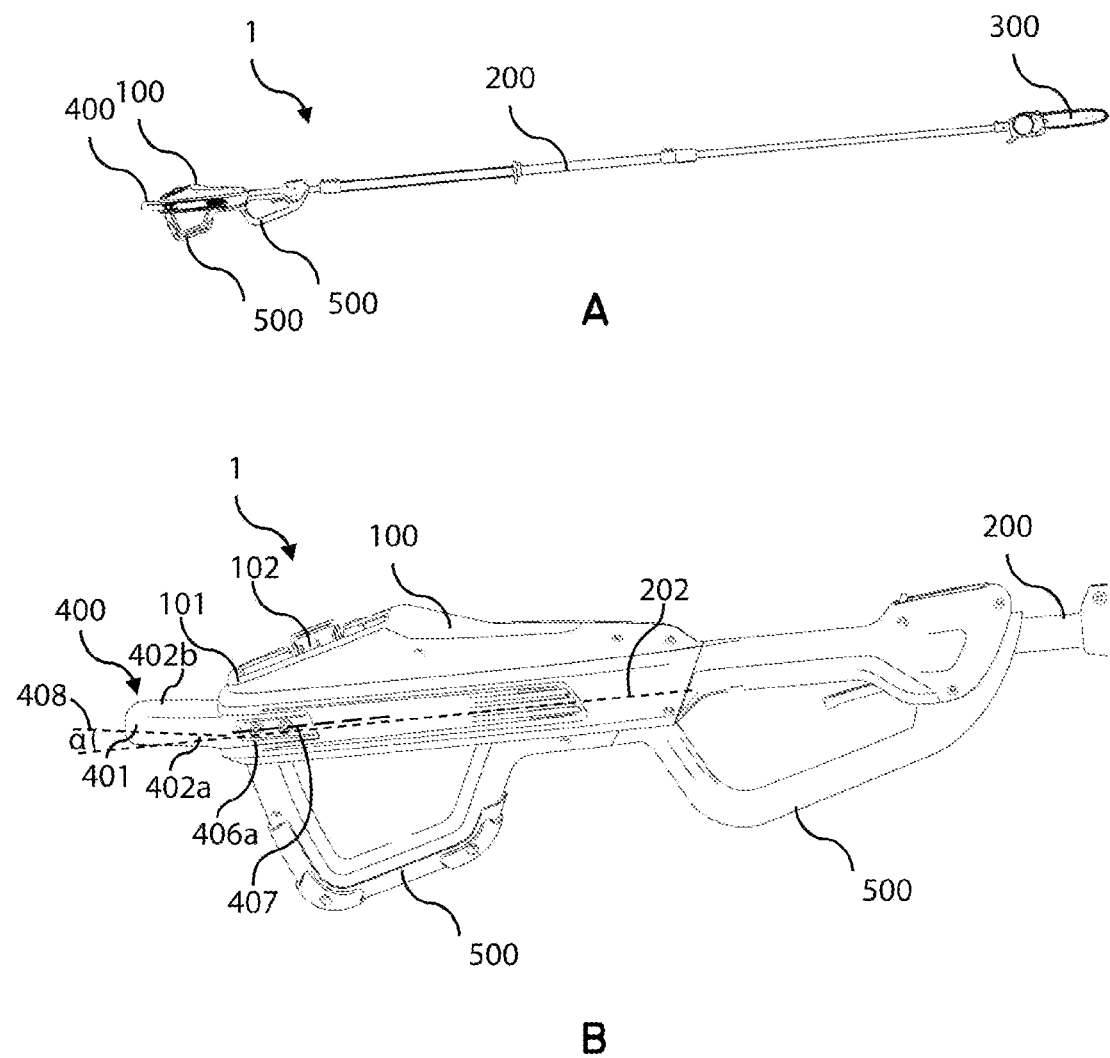
FIG. 1a is a perspective view of a cutting tool comprising an impact protecting member according to an aspect.
FIG. 1b is a side view of the tool of FIG. 1a, and specifically a side view of the rear portion of the cutting tool according to an aspect.
Figure 2:
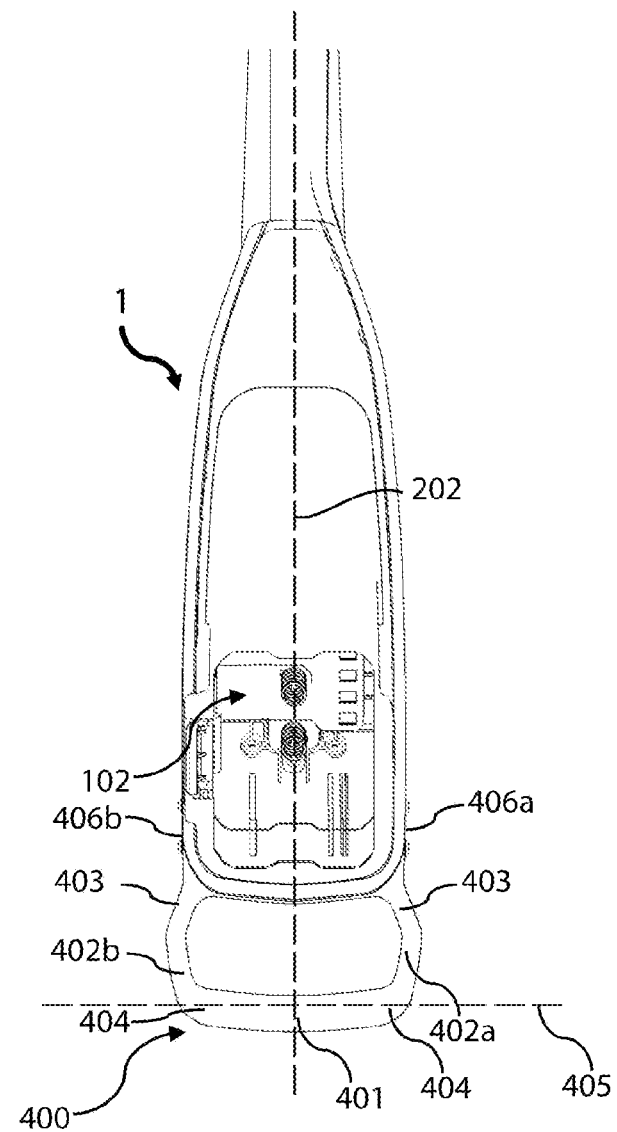
FIG. 2 is a top-down perspective view of a cutting tool comprising an impact protecting member according to an aspect.

FIGS. 1 and 2 show a cutting tool 1 comprising a housing 100 and an impact protecting member 400. The cutting tool 1 comprises a longitudinal extension member 200 extending from the housing 100 to a cutting element 300 provided at the distal end of the longitudinal extension member. The cutting tool 1 is a longitudinally extending cutting tool 1, having a longitudinal extension 200, defining a first longitudinal axis 202, from the housing 100 to the cutting element 300. The housing 100 is provided at the proximal end of the longitudinal extension member 200. The housing 100 is provided with a substantially rigid impact protecting member 400 having at least a rigid portion 401. The rigid portion 401, defining a second longitudinal axis 405, being transverse to the longitudinal extension of the cutting tool 1 and arranged at a distance from the housing such that the rear 101 of the housing 100 is protected from an impact that engages the rigid portion 401 before engaging the rear 101 of the housing 100.

The rigid portion 401 is arranged in substantial alignment with the lateral axis of the housing 100. This, as will be further discussed below, improves the stability of the cutting tool 1 when it is stored vertically, resting on the rigid portion 401 of the impact protecting member 400.

The housing 100 is arranged at the proximal, rear portion of the cutting tool 1. The housing 100 generally may enclose and encapsulate a controlling means for the cutting tool 1. The housing 100 may be adapted to receive an energy storage means. The housing 100 may comprise a releasably interface 102 for receiving and connecting to an energy storage means. The energy storage means may be a battery pack. Wear on the housing 100 may lead to destruction of the energy storage means, or even the controlling means enclosed within the housing 100. The impact protecting member 400 protects the rear 101 of the housing 100 from impact during usage and therein protects the energy storage means and/or the controlling means from potentially destructive impacts.

The impact protecting member 400 has an additional advantage in that it can be used as a handle during transportation. It may furthermore be used as a member for receiving a locating and storage means. The cutting tool may be, for example, hung from the impact protecting member 400 as it is rigid and fixedly mounted to the housing 100.

Figure 3:
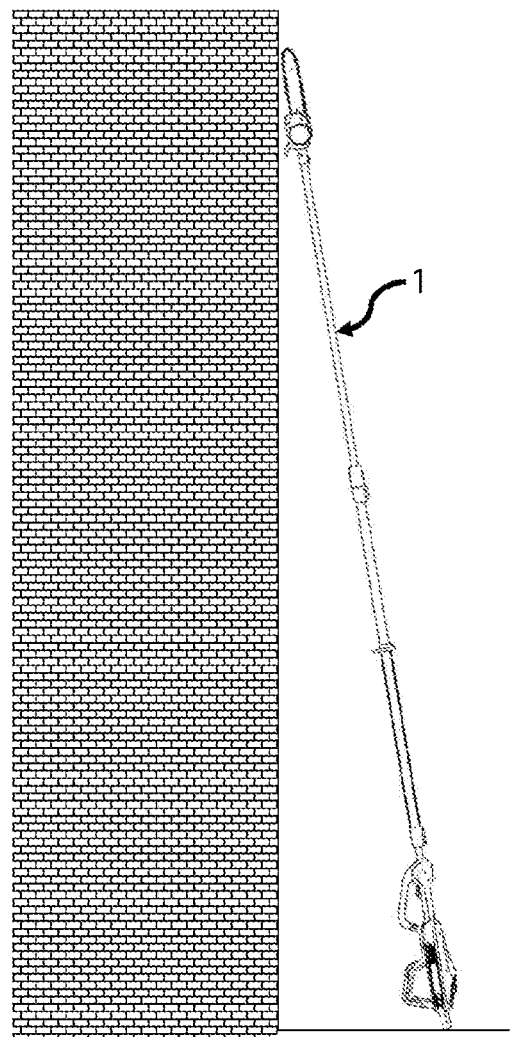
FIG. 3 is a perspective view of a cutting tool according to an aspect in a vertical storage position.

Often the cutting tool 1 will be stored in a vertical alignment as is shown in FIG. 3. A vertically aligned storage position generally refers to the case when the cutting tool has its longitudinal extension arranged vertically and when the distal end of the cutting tool, that is, the end comprising the cutting element 300, is higher than the proximal end. In such an arrangement the cutting tool 1 has the cutting element 300 directed upwards. Generally, in such a storage position, the cutting tool 1 rests partially on a surface, such as the ground, and the cutting element 300 rests against for example a wall. When stored in such an arrangement, the substantially straight and rigid portion 401 of the impact protecting member 400 may act as a stable base or platform for the cutting tool 1. With such a rigid member 401 the cutting tool 1 may be reliably stored in a vertical alignment without the housing 100 touching the surface, for example, the ground, on which the cutting tool is placed. The impact protecting member 400 therefore, and as stated above, results in less wear on the housing 100 of the cutting tool 1.

Furthermore, by ensuring that the housing 100 does not rest on the ground then the energy storage means and/or the controlling means are protected from the ingress of water, mud, dirt etc. which may be present on the surface on which the cutting tool 1 is placed. Therein, the cutting tool 1 has an improved environmental resistance.

The rigid portion 401 is substantially straight. It is arranged substantially transverse to the longitudinal extension of the cutting tool 1. As the rigid portion 401 is substantially straight the cutting tool is more stable when stored resting at least partially on the rigid portion 401 in a vertical alignment. As can be seen in FIG. 2, the rigid portion 401 may be slightly curved. However, the curvature of the rigid portion 401 should be limited such that the cutting tool 1 does not tend to rotate when stored in a vertical alignment.

The impact protecting member 400 may be fixed to the housing 100 via first and second arms 402a, 402b. Each of the arms 402a, 402b has a longitudinal extension. The first 402a and second 402b arms connect at their respective first ends 406a, 406b, which define a third longitudinal axis 407 that is parallel to the first longitudinal axis 202, to the housing 100. The arms connect at their respective second ends to the substantially rigid portion 401. The fourth longitudinal axis 408 of the arms is provided at an acute angle α to the longitudinal extension and first longitudinal axis 202 of the cutting tool 1. The angle may be from 2° to 60°, such as about 15°. The angle be from 2° to 15°.

The angle of the arms to the longitudinal axis of extension of the cutting tool 1 results in a more stable platform or base for the cutting tool when it is stored vertically. When stored in a vertical alignment the cutting tool will generally form an acute angle to the plane which is perpendicular to the surface on which it is stored. By providing the angular offset a to the first 402a and second 402b arms the centre of mass of the cutting tool 1 is further inside the rigid portion 401, relative to if there was no angle provided to the first 402a and second 402b arms, and therein the cutting tool rests with greater stability.

The first 402a and second 402b arms may connect to the housing 100 via fixing means, such as screws. The first 402a and second 402b arms are generally rigid, and form a rigid connection to the first portion 401. The first 402a and second 402b arms also protect the housing 100 from impacts.

The first 402a and second 402b arms may comprise a first proximal portion, nearer the housing 100, or in connection to the housing 100, which is substantially in alignment with the longitudinal axis of extension of the cutting tool 1. The angle α may then be provided in a region of the first 402a and second 402b arms, such that a distal portion of the arms 402a, 402b is at the angle α. As the housing is generally substantially straight and aligned with the longitudinal extension of the cutting tool 1 this means that there is no need for angle slots or connections where the housing 100 and the arms 402a, 402b connect. It also enables the housing to be thinner, that is, of reduced depth from the upper portion to the lower portion as the housing 100 needs only to be as thick as the proximal portions of the arms 402a, 402b.

The rigid portion 401 and the first 402a and second 402b arms of the impact protecting member 400 form a substantially rectangular impact protecting member 400. The rectangular shape, when viewed from above, or below, extends from the rear 101 of the housing 100. The plane of the rectangle is, due to the angle α of the arms, at the angle α to the lateral plane formed by the housing 100.

As shown in FIG. 1, the cutting tool 1 may comprise at least one, such as two, handle(s) 500. The at least one handle 500 is generally arranged at, or in connection to, a bottom portion of the housing 100. The angle α at which the arms 402a, 402b extend from the housing 100 is away from the at least one handle 500. That is, the angle α is upwards from the first longitudinal axis 202, as shown in FIG. 1b, in the opposite direction from the downwardly extending at least one handle 500. This improves stability when the cutting tool 1 is stored vertically as has been described previously as it moves the centre of gravity further inwards.

Intermediate portions 404 may connect the first substantially straight rigid member 401 of the impact protecting member 400 to the first 402a and second 402b arms. These intermediate portions 404, or corners, may have an inner curvature and an outer curvature.

The first 402a and second 402b arms may be furthermore provided with proximal portions 403, near the housing 100, which extend at an angle laterally outward from the housing 100. The general rectangular form of the impact protecting member 400 is not substantially altered with such proximal portions 403.

The impact protecting member 400 may be arranged at an upper portion of the housing. The first 402a and second 402b arms may extend from an upper position of the housing 100. The lower portion of the housing may comprise the energy storage means, such as a battery pack.

The rigid portion 401 of the impact protecting member 400 may have a rectangular cross section. The rigid portion 401 may have a cross section which is substantially rectangular at an upper portion, and curved at a lower portion. The two partial cross sections may provide the impact protecting member with an improved ergonomic function if the impact protecting member 400 is used to hold the cutting tool 1. The rectangular portion of the first rigid and substantially straight portion 401, however, enables the impact protecting member 400 to better support the cutting tool 1 when it is used as a support or platform for the cutting tool 1 stored in a vertical alignment.

The impact protecting member 400 may be made from a substantially rigid material, such as a metal or plastic, or a combination thereof. The rigid portion 401 and the first 402a and second 402b arms may be integral, that is, not composed of separate and distinct members but formed from a single piece of material.

The cutting tool 1 referred to herein may be a variety of cutting tools which have a longitudinal extension. The impact protecting member 400 is especially suitable for tools often called pole, or telescopic hedge trimmers, or pole/telescopic saws. These devices generally have long intermediate longitudinal portions such that a user may reach higher or further from their standing position. As these devices are generally quite long they are especially prone to inadvertent impacts. They are also generally stored vertically.

The impact protecting member 400 is especially suited to cutting tools in which the energy storage means is a battery pack. Battery packs are sensitive to impacts and a destructive impact to a battery pack may cause damage to the device, or injure the user of the device through the leakage of hazardous materials. It is therefore essential that in cases where the cutting tool is powered by a battery pack then it is well protected from impacts.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A cutting tool comprising:
    a housing having first and second opposite ends,
    a cutting element,
    a longitudinal extension member defining a first longitudinal axis and being coupled to and extending in a distal or first direction from the first end of the housing to the cutting element, the first end of the housing located closer to the cutting element than the second end of the housing,
    at least one handle extending from the housing,
    a rigid impact protecting member having first and second arms and a rigid portion, the rigid portion defining a second longitudinal axis that transverses the first longitudinal axis, the first and second arms each have a first portion fixed to the second end of the housing and a second portion connected to the rigid portion so that the rigid portion is spaced from the housing thereby allowing the rigid portion to be configured for protecting the second end of the housing from an impact that engages the rigid portion before engaging the second end of the housing, and
    when viewed from a side view of the tool, the first portions define a third longitudinal axis and the second portions define a fourth longitudinal axis, the third longitudinal axis is parallel with the first longitudinal axis and the fourth longitudinal axis defines an acute angle with the first longitudinal axis so that the rigid impact member extends from the second end of the housing in a proximal or second direction which is generally opposite the distal or first direction.

2. The cutting tool according to claim 1, wherein the rigid portion of the impact protecting member is substantially straight.

3. The cutting tool according to claim 1, wherein the rigid portion and the first and second arms of the rigid portion form a substantially rectangular impact protecting member.

4. The cutting tool according to claim 1, wherein the rigid portion is configured to be used as a support platform for the cutting tool when the cutting tool is arranged with the longitudinal extension member in a vertical orientation.

5. The cutting tool according to claim 1, wherein the housing is adapted to receive an energy storage means and the rigid portion protects the energy storage means from an impact to the second end of the housing.

6. The cutting tool according to claim 1, wherein the at least one handle comprises a first handle and a second handle.

7. The cutting tool according to claim 1, wherein the angle is from 2° to 60°.

8. The cutting tool according to claim 1, wherein the angle is from 2° to 15°.

9. The cutting tool according to claim 1, wherein the angle is 2°.

10. The cutting tool according to claim 1, wherein the angle is about 15°.

* * * * *